United States Patent
Buckley et al.

(10) Patent No.: US 8,073,447 B2
(45) Date of Patent: Dec. 6, 2011

(54) SYSTEM AND METHOD TO IDENTIFY VOICE CALL CONTINUITY (VCC) SUBSCRIBER

(75) Inventors: Adrian Buckley, Tracy, CA (US); Rene W. Purnadi, Coppell, TX (US)

(73) Assignee: Research In Motion Limted, Waterloo, Ontario (CA)

( * ) Notice: Subject to any disclaimer, the term of this patent is extended or adjusted under 35 U.S.C. 154(b) by 492 days.

(21) Appl. No.: 11/671,237

(22) Filed: Feb. 5, 2007

(65) Prior Publication Data
US 2008/0186953 A1 Aug. 7, 2008

(51) Int. Cl.
*H04W 36/00* (2009.01)
*H04M 3/42* (2006.01)
*H04M 3/00* (2006.01)
*H04L 12/66* (2006.01)

(52) U.S. Cl. ........ 455/437; 455/436; 455/416; 455/418; 370/352

(58) Field of Classification Search .................. 455/436, 455/414.1–418, 437; 370/401, 352
See application file for complete search history.

(56) References Cited

U.S. PATENT DOCUMENTS

| | | | |
|---|---|---|---|
| 6,205,328 B1 * | 3/2001 | Lantto et al. | 455/414.1 |
| 2006/0209805 A1 | 9/2006 | Mahdi et al. | |
| 2006/0268849 A1 | 11/2006 | Larsson et al. | |
| 2007/0014281 A1 | 1/2007 | Kant | |
| 2007/0183411 A1 * | 8/2007 | Song et al. | 370/352 |
| 2007/0183438 A1 * | 8/2007 | Song et al. | 370/401 |
| 2007/0201662 A1 * | 8/2007 | Song et al. | 379/201.01 |
| 2007/0280162 A1 * | 12/2007 | Deshpande et al. | 370/331 |
| 2008/0069085 A1 * | 3/2008 | Song et al. | 370/352 |
| 2008/0090570 A1 * | 4/2008 | Deshpande et al. | 455/436 |

FOREIGN PATENT DOCUMENTS

| | | |
|---|---|---|
| EP | 1835687 A1 | 9/2007 |
| WO | 2006138736 A2 | 12/2006 |
| WO | 2007081146 A1 | 7/2007 |
| WO | 2007091794 A1 | 8/2007 |

OTHER PUBLICATIONS

PCT International Search Report; PCT/CA2008/000073; May 7, 2008; 3 pgs.
PCT Written Opinion of the International Searching Authority; PCT/CA2008/000073; May 7, 2008; 4 pgs.

(Continued)

*Primary Examiner* — Marivelisse Santiago Cordero
*Assistant Examiner* — Mong-Thuy Tran
(74) *Attorney, Agent, or Firm* — Conley Rose, P.C.; J. Robert Brown, Jr.

(57) ABSTRACT

A mobile device, method, and machine instructions for mobile device communication are provided. The mobile device includes a voice call continuity status checker to determine a voice call continuity status and use the voice call continuity status to determine whether to initiate voice call continuity related activities. The method includes determining a voice call continuity status and using the voice call continuity status to determine whether to initiate voice call continuity related activities. When executed, the machine instructions perform a method that includes determining a voice call continuity status and using the voice call continuity status for voice call continuity related activities.

24 Claims, 5 Drawing Sheets

OTHER PUBLICATIONS

LG Electronics, "CR to 24.206: Restriction of Domain Transfer", 3GPP TSG CT WG1#45, Vancouver, Canada, Jan. 29, 2007, 17 pgs.
3rd Generation Partnership Project; "Technical Specification Group Services and System Aspects—Voice Call Continuity between CS and IMS Study"; 3GPP TR 23.806 v7.0.0; Dec. 2005; 153 pgs.
European Search Report; EP Application No. 07108765.4; Oct. 4, 2007; 7 pgs.
Research In Motion Limited; Australian Examination Report; Australian Patent Application No. 2008213753; Jun. 1, 2010; 2 pgs.
Korean Office Action dated Apr. 13, 2011; Application No. 10-2009-7017233; 6 pages.
Japanese Office Action; Application No. 2009-547498; Jul. 11, 2011; 10 pages.
Mexican Office Action; Application No. MX/a/2009/008258; Jul. 22, 2011; 6 pages.

* cited by examiner

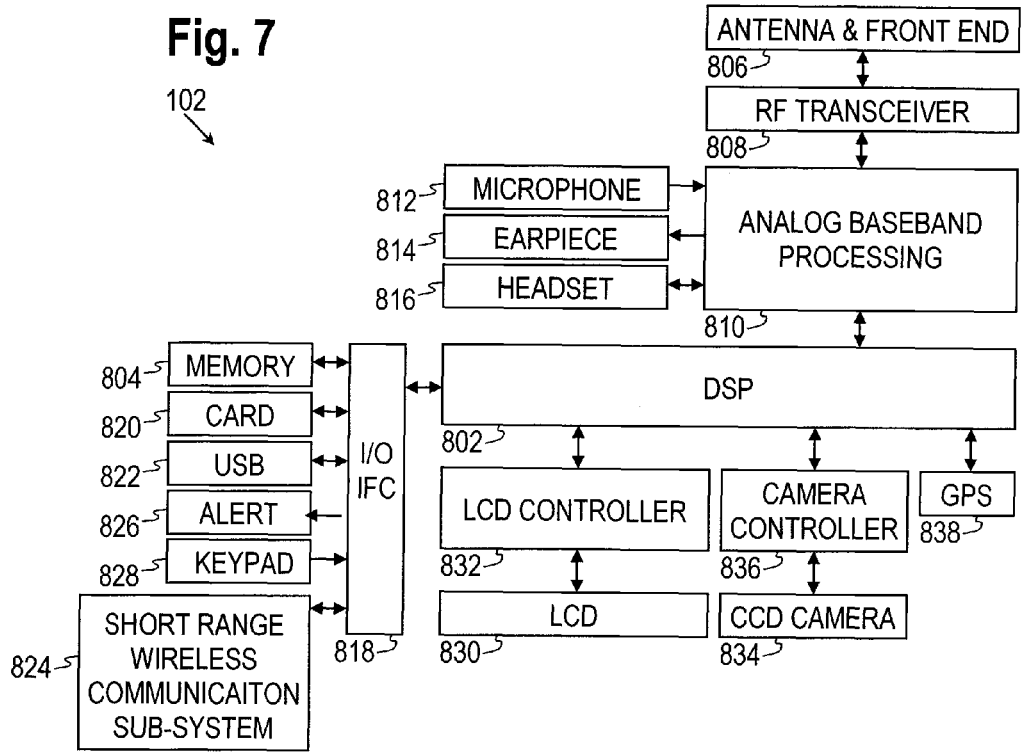
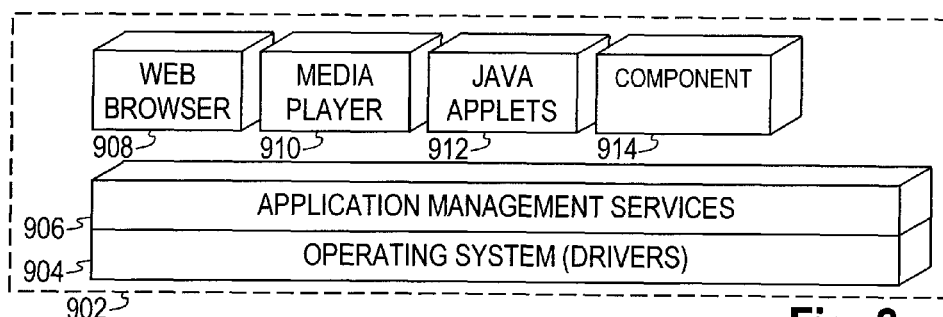

SYSTEM AND METHOD TO IDENTIFY VOICE CALL CONTINUITY (VCC) SUBSCRIBER

BACKGROUND

Easily transportable devices with wireless telecommunications capabilities, such as mobile telephones, personal digital assistants, handheld computers, and similar devices, will be referred to herein as mobile devices. Some mobile devices communicate in a circuit switching mode, wherein a dedicated communication path may typically exist between two devices. For the duration of a call, all data exchanged between the two devices travels along the single path. An example of a telecommunications protocol that uses circuit switching is the Global System for Mobile Communications (GSM).

Some mobile devices also have the capability to communicate in a packet switching mode. In packet switching, a data stream is divided into packets that are given unique identifiers. The packets might then be transmitted from a source to a destination along different paths and might arrive at the destination at different times. Upon reaching the destination, the packets are reassembled into their original sequence based on the identifiers. An example of a telecommunications protocol that uses packet switching is the Session Initiation Protocol (SIP).

Communications that take place via circuit switching can be said to occur in the circuit switching domain and communications that take place via packet switching can be said to occur in the packet switching domain. Mobile devices that can communicate in only the circuit switching domain or only the packet switching domain can be referred to as single domain devices or single mode devices. Mobile devices that can communicate in both the circuit switching domain and the packet switching domain can be referred to as dual domain devices or dual mode devices. A communications connection in the circuit switched domain or in the packet switched domain can be referred to as a call or a session. These calls or sessions may carry voice or data.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 7 is a block diagram of a mobile device operable for some of the various embodiments of the disclosure.

FIG. 8 is a diagram of a software environment that may be implemented on a mobile device operable for some of the various embodiments of the disclosure.

DETAILED DESCRIPTION

Figure 1:
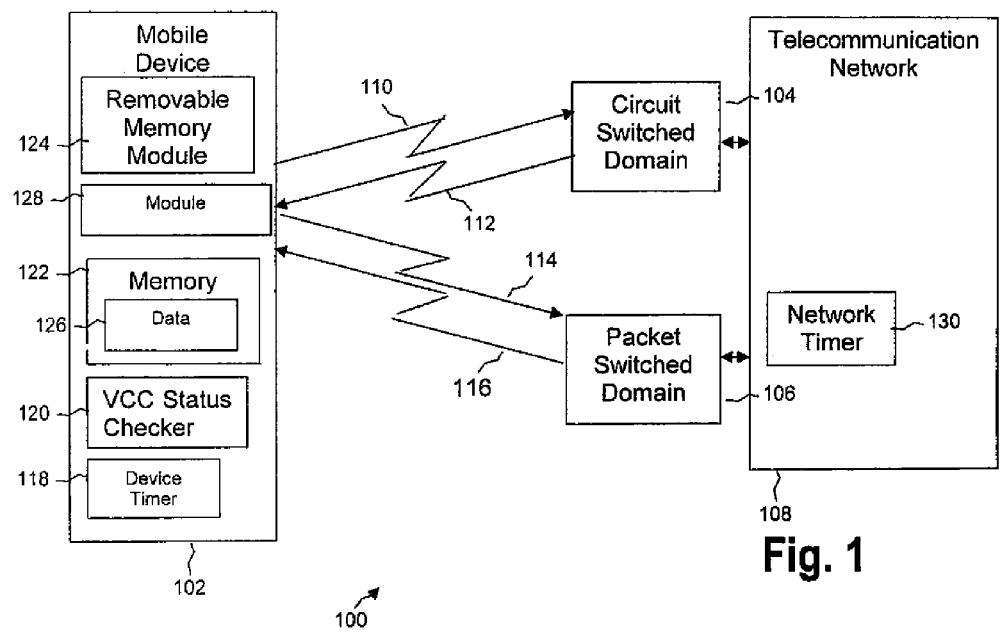
FIG. 1 is a block diagram of a system including a mobile device operable to communicate in the circuit switched domain and in the packet switched domain according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Voice Call Continuity (VCC) technology is a service that enables a mobile device to transfer a voice call from the circuit switched domain to the packet switched domain and vice versa. The circuit switched domain offers supplementary services to mobile device service subscribers such as call hold and call waiting. Both of these services are controlled by the visitor mobile switching center (VMSC) in which the mobile device service subscriber is registered. However, when a VCC operation is invoked, the mobile device may no longer be able to communicate with the VMSC to control these services. Mobile device standards specify that when VCC is invoked for a mobile device that is connected to both an active call and an inactive call, such as a call on hold or a call waiting, the mobile device is to drop the inactive call before performing VCC. In some instances, however, this may not be desirable. For example, if a user of a mobile device is not a VCC subscriber, the mobile device will drop the call, but not perform the VCC switch to the packet switched domain because the user does not subscribe to the VCC service. Therefore, the non-VCC subscriber will suffer a degradation in their service when none should have happened.

Because the mobile device is required to drop the inactive call as part of the domain transfer procedures, the mobile device needs to determine whether the subscriber is a VCC subscriber. For example, if a VCC subscriber gives his mobile device to a non-VCC subscriber, the non-VCC subscriber may moves the mobile device into range of a wireless local area network. The mobile device may attempt to reduce call costs by invoking VCC to transfer a call from the more expensive circuit switched domain to the less expensive packet switched domain. The mobile device drops the inactive call before attempting VCC even though VCC will fail for the non-VCC subscriber. Therefore, the non-VCC subscriber loses the inactive call unnecessarily, because no VCC switch ever takes place The present disclosure provides systems and methods for determining a VCC status, such as whether the subscriber is a VCC subscriber or whether the call is anchored to a VCC server, before initiating VCC related activities, such as dropping the second call or attempting a domain transfer. The VCC status may be obtained by the mobile device during registration, call setup, or by information stored in the memory of the mobile device.

In one embodiment, a mobile device is provided. The mobile device includes a voice call continuity status checker configured to determine a voice call continuity status and to determine whether to initiate voice call continuity related activities based upon the voice call continuity status. In another embodiment, a method for mobile device communication is provided. The method includes determining a voice call continuity status, and determining whether to initiate voice call continuity related activities based upon the voice call continuity status. In still other embodiments, machine instructions are provided that when executed perform a method comprising determining a voice call continuity status, and using the voice call continuity status for voice call continuity related activities.

FIG. 1 is a block diagram of an embodiment of a system 100 that includes a mobile device 102, a circuit switched domain 104, a packet switched domain 106, and a telecommunication network 108. The mobile device 102 might send a message 110, such as when attempting to setup, handover, or otherwise administer calls in the circuit switched domain 104. A message 112 might be sent to the mobile device 102 from the circuit switched network 104 and/or telecommunication network 108. Similarly, the mobile device 102 might send a message 114, such as when attempting to setup, handover, or otherwise administer calls in the packet switched domain 106. A message 116 might be sent to the mobile device 102 from the packet switched network 104 and/or telecommunication network 108. Although shown as a separate entity, the telecommunications network 108 may be part of or include portions of the circuit and/or packet switched networks 104 and 106.

The mobile device 102 includes a device timer 118 to measure the length of time after a call is setup before a message responds to the call setup. In some embodiments, the mobile device 102 includes a Voice Call Continuity (VCC) status checker 120, a memory 122, and a removable memory module 124. The removable memory module 124 can be a universal subscriber identity module, a removable user identity module, a secure digital card, a compact flash, or a similar component. Although FIG. 1 depicts that the memory 122 includes the data 126, alternatively the removable memory module 124 might include the data 126. The data 126 might maintain information about the subscriber or user, including details of the subscriber's subscription(s) to services, such as whether the subscriber using the mobile device 102 is a VCC subscriber.

The mobile device 102 may be used by multiple users, each having different user information and subscribing to different services. For example, one user of the mobile device 102 may be a VCC subscriber, as well as subscribing to other services provided by the telecommunication network 108 or otherwise provided. The user might loan or share the mobile device 102 with another user that subscribes to different services. The other user might not be a VCC subscriber, for example. Before using the device, either user might insert their personal removable memory module 124 which contains, among other things, the listing of subscribed services. The subscriber may also identify themselves by inputting a private identity or a public identity that the network could map to said private identity.

The VCC status checker 120 can read the data 126 to determine if the subscriber for the mobile device 102 is a VCC subscriber. The subscription data 126 may be obtained and updated in various manners. In one embodiment, the subscription data 126 is embedded in removable memory module 124 or obtained from the telecommunication network 108 during registration, such as when the mobile device is turned on and first communicates with the telecommunication network 108, or during periodic re-registrations. The telecommunication network 108 would maintain a list of the subscriptions of each customer, user, or subscriber, and would provide the subscription information related to the current user of the mobile device 102. The VCC status checker 120 might also check the data 126 to determine if any VCC activity has been successfully performed for the subscriber. For example, each time a VCC domain transfer is accomplished, the data 126 might be updated.

The mobile device 102 includes a module 128 which has a first mode to communicate via the circuit switched domain 104 and has a second mode to communicate via the packet switched domain 106. The module 128 might also include the VCC capability that enables the mobile device 102 to perform a domain transfer of a call between the circuit switched domain 104 and the packet switched domain 106.

The telecommunication network 108 communicates with the circuit switched domain 104 and the packet switched domain 106. The telecommunication network 108 includes a network timer 130 that can measure the length of time after the telecommunication network 108 sends a message before receiving an acknowledgement to the message.

Figure 2:
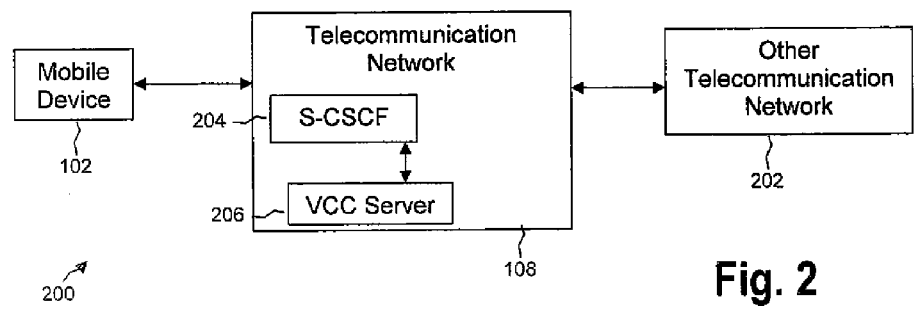
FIG. 2 is a block diagram of another embodiment of a system including the mobile device.

FIG. 2 is a block diagram of an embodiment of a system 200 that includes the mobile device 102, the telecommunication network 108, a serving call session control function (S-CSCF) 204, a VCC server 206, and another telecommunication network 202. The other communication network 202 is provided as an example of the network through which a called party might make or receive calls from the mobile device 102.

The S-CSCF 204 is an IP Multimedia Subsystem (IMS) packet switching-based component that can be considered a SIP server. The VCC server 206 is the component in which a call that might be transferred between the circuit switched domain and the packet switched domain is typically anchored. As will be readily apparent to one skilled in the art, the VCC server 206, in this embodiment, is DTF (Domain Transfer Function), CSAF (CS Adaptation Function), DSF (Domain Selection Function) and Camel Service Logic per 3GPP Technical Specification (TS) 23.206. During call setup, a registration process takes place in which the mobile device 102 specifies to the S-CSCF 204 that it is capable of placing both circuit switched calls and packet switched calls and specifies the component that will act as the VCC anchor, such as the VCC server 206. The S-CSCF 204 and the VCC server 206 may be part of the telecommunication network 108.

Figure 3:
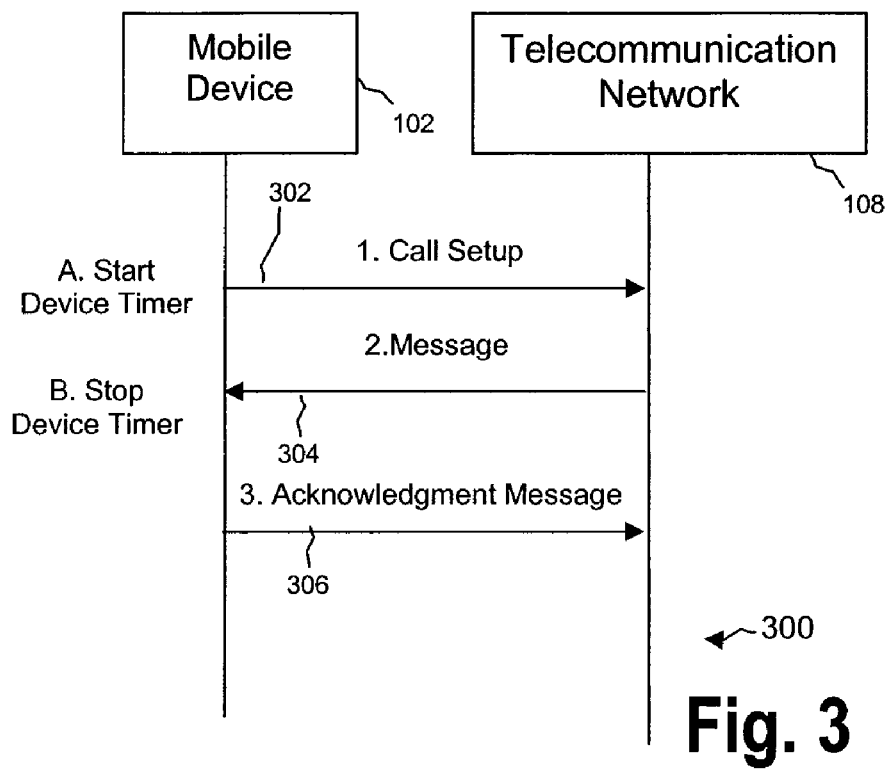
FIG. 3 is a call flow diagram for a call that is setup in the circuit switched domain according to an embodiment of the disclosure.
Figure 4:
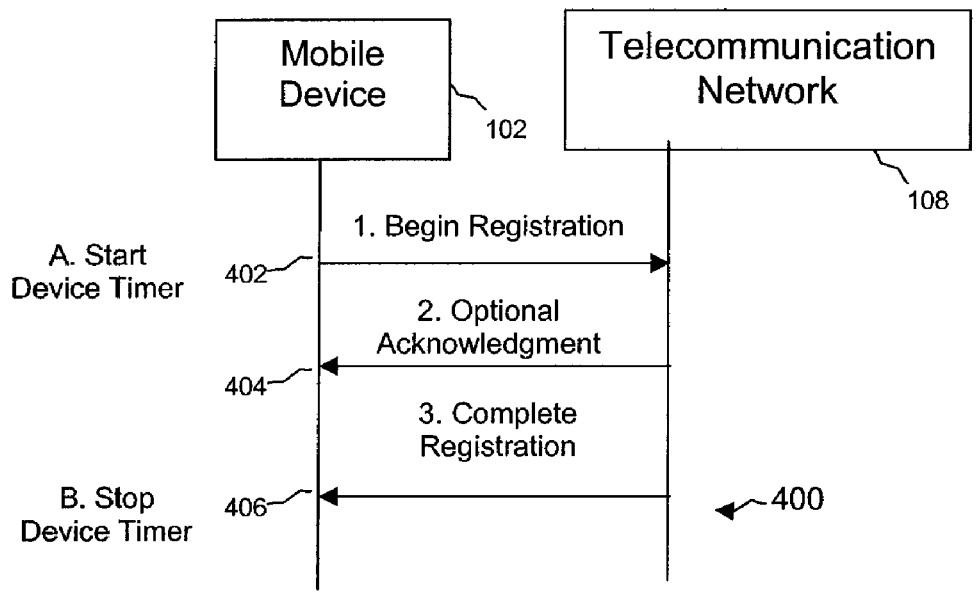
FIG. 4 is a call flow diagram for a mobile device that registers with a communication network according to an embodiment of the disclosure.

FIGS. 3 and 4 are call flow diagrams 300 and 400 depicting examples of a series of events that might occur between the mobile device 102 and the communications network 104. In some embodiments, the protocol used for the call attempts in the circuit switched domain is UTRAN (UMTS Terrestrial Radio Access Network) and the protocol used for the call setups in the packet switched domain is SIP. Other circuit switched protocols and/or packet switched protocols could be used in other embodiments.

FIG. 3 is a call flow diagram 300 depicting an example of a series of events that might involve VCC service with the mobile device 102 and the telecommunication network 108. At event 302, the mobile device 102 begins the setup of a call in the circuit switched domain with telecommunication network 108 or network node. In this embodiment, the protocol used for the call setup in the circuit switched domain is UMTS per 3GPP TS 24.008, however other protocols could be used. The mobile device 102 will be configured based on operator policy and/or user preferences. The establishment of the VCC Server 206 as the VCC anchor for the call may also occur at event 302.

The device timer 118 starts at event 302 when the setup message is sent by the mobile device 102 to the telecommunication network 108. The telecommunication network 108 has until the timer expires to provide the VCC specific information to the mobile device 102, otherwise the mobile device 102 will assume that there is no VCC subscription or the call is not VCC anchored. Such information could be provided by USSD, SMS, SIP or another protocol.

At event 304, the telecommunication network 108 sends a message, such as message 112, to the mobile device 102. The content of the message is based on the VCC status determined by the telecommunication network 108 for the mobile device 102 and the current mobile device 102 subscriber. The telecommunication network 108 can determine the VCC status based on whether the subscriber for the mobile device 102 is a VCC subscriber or based on whether the call is anchored to the VCC server 206. If the call setup by the mobile device 102 is anchored to the VCC server 206, then it can be inferred that the subscriber using the mobile device 102 is a VCC subscriber, because calls should only be anchored to the VCC server 206 for VCC subscribers. Calls anchored to the VCC server 206 suggest that the telecommunication network 108 has previously determined that the subscriber for the mobile device 102 is a VCC subscriber and anchored the call accordingly. The telecommunication network 108 includes data that identifies subscribers that are VCC subscribers.

The message can indicate that the subscriber currently registered for the mobile device 102 is a VCC subscriber. The message can also indicate that the subscriber currently registered for the mobile device 102 is not a VCC subscriber. Additionally, the message can indicate that although the subscriber currently registered for the mobile device 102 is a VCC subscriber, domain transfers are not allowed. Domain transfer may not be allowed in instances, for example, where the telecommunication network 108 determines that the VCC server 206 is currently over capacity and cannot handle any additional traffic.

The VCC status checker 120 reads a parameter in the response message sent by the telecommunication network 108 to determine the VCC status for the mobile device 102 at event 304. The mobile device 102 uses the VCC status to determine whether to domain transfer an active call and to drop an inactive call. Where the message from the telecommunication network 108 indicates that the call is not anchored to a VCC server 206, and/or that the subscriber is not a VCC subscriber, the mobile device 102 will not drop or attempt to drop an inactive call and will not attempt a domain transfer. When the message indicates that the subscriber is a VCC subscriber, and/or that the call is VCC anchored, the mobile device 102 drops the inactive call and performs the VCC. In other embodiment, the present disclosure provides for transferring both the active and one or more inactive calls as well.

The mobile device 102 also stops the device timer 118 upon receipt of the response message at event 304. If the device timer 118 were to expire before the mobile device 102 received the response message from the telecommunication network 108, the mobile device 102 would have determined that the subscriber was not a VCC subscriber or that the call was not VCC anchored.

The telecommunication network 108 may resend the response message sent at event 304. The number of times that the telecommunication network 108 attempts to resend the response message is configurable. The messages may be sent using various data transmission protocols such as GSM, SIP, Code Division Multiple Access (CDMA), the Universal Mobile Telecommunications System (UMTS), and others.

FIG. 4 is a call flow diagram 400 depicting an example of events that might occur when the mobile device 102 registers with the telecommunication network 108. It is well known in the art that mobile devices undergo a registration process in which they specify their capabilities. The mobile device 102 can begin the registration process when the mobile device 102 is turned on, but the mobile device 102 can also begin the registration process following an extended period of inactivity for the mobile device 102.

The mobile device 102 begins the registration process every time that the mobile device 102 is turned on because the subscriber for the mobile device 102 may have changed when the mobile device was turned off. In this way, the telecommunications network 108 and/or a computer network with which the mobile device 102 might communicate can be aware of whether the mobile device 102 is a dual mode device or a single mode device and whether the mobile device 102 includes the module 128 that provides VCC capability.

At event 402, the mobile device 102 begins the registration process in the circuit switched domain by sending a registration message, such by sending the message 110 to the telecommunication network 104. The protocol used for the registration message might be SIP register, CDMA Register, GPRS attach, or a similar protocol.

The device timer 118 starts at event 402 when the register message is sent by the mobile device 102 to the telecommunication network 108. The telecommunication network 108 has until the timer expires to provide the VCC specific information to the mobile device 102, otherwise the mobile device 102 will assume that the subscriber is not a VCC subscriber or that VCC capability is not available.

At event 404, the telecommunication network 108 sends an optional acknowledgment message, such as message 112. The optional acknowledgment message is an acknowledgment that the telecommunication network 108 received the registration message sent by the mobile device at event 402.

At event 406, the telecommunication network 108 sends a message, such as message 112 to the mobile device 102. The message can be sent using SMS, USSD (Unstructured Supplementary Service Data), IP (Internet protocol) transport, or other method. The message includes registration information that is used to configure the mobile device 102 for operation. The message can also include a parameter based on the VCC subscription status determined by the telecommunication network 108 for the mobile device 102. The telecommunication network 108 can determine the VCC status based on whether the subscriber for the mobile device 102 is a VCC subscriber. The telecommunication network 108 includes data that identifies which subscribers are VCC subscribers.

The VCC status checker 120 reads the parameter in the response message sent by the telecommunication network 108 to determine the VCC status for the mobile device 102, at event 406. After event 406, the mobile device 102 uses the VCC status to determine whether to domain transfer an active call and to drop an inactive call.

The mobile device 102 stops the device timer 118 upon receipt of the response message at event 406. If the device timer 118 expires before to the mobile device 102 received the response message from the telecommunication network 108, the mobile device 102 would determine that the subscriber is not a VCC subscriber, or that VCC was not currently available on the telecommunication network 108.

In other embodiments, the mobile device 102 may determine its VCC status without communicating with the telecommunication network 108. Instead, the VCC status checker 120 on the mobile device determines the VCC status for the mobile device 102 by checking VCC status information stored on the mobile device 102. The information may be stored in the memory 122 or the removable memory module 124 of the mobile device 102. The storage device can include the data 126 that identifies, for example, the subscriber and whether the subscriber is a VCC subscriber. Subscriber identifiers can include International Mobile Subscriber Identifier (IMSI), IMS Protocol Multimedia Private User Identity (IMPI) e.g. TS 23.003, Mobile Identifier Number (MIN), or other identification system. The mobile device 102 uses the VCC status to determine how to handle VCC activities such as whether to drop inactive calls and domain transfer active calls, for example. The data 126 can also be configurable by various over the air mechanisms, such as SMS (Short Message Service) over the air, OMA/DM (Open Mobile Alliance Device Management), or proprietary or other methods.

In still other embodiments, combinations of the above VCC status checking may be employed. For example, where the VCC status is determined during registration it may be stored on the removable memory module 124 or elsewhere on the mobile device 102. A flag may be set when the removable memory module 124 is removed or changed to indicate that the VCC status needs to be updated. However, as long as the same removable memory module 124 is used in the mobile device 102, the VCC status stored in memory is up to date.

The network timer 130 may be used at various points while communicating with the mobile device 102 to determine whether the mobile device is VCC capable. The network timer might be started in response to a message being sent to the mobile device. The mobile device 102 might then have until the timer expires to provide the mobile device's VCC capability information to the telecommunication network 108, otherwise the telecommunication network 108 will assume that the mobile device 102 is not VCC capable.

Figure 5:
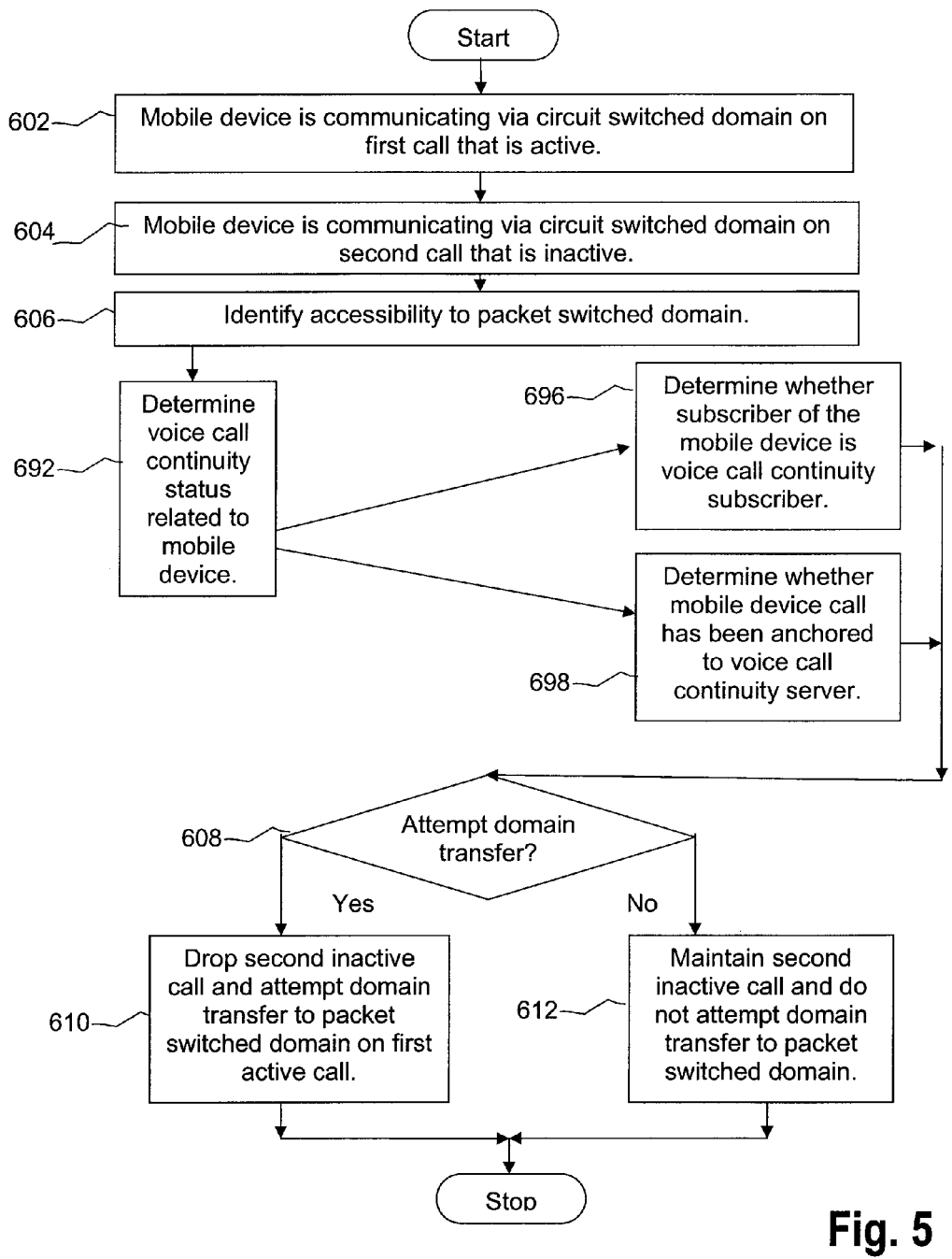
FIG. 5 is a diagram of a method for identifying the voice call continuity status according to an embodiment of the disclosure.

FIG. 5 is a diagram, according to one embodiment, of a method for identifying if subscribers are VCC subscribers. At box 602, the mobile device 102 communicates via the circuit switched domain 104 on a first call that is active. For example, the user of the mobile device 102 made a voice call and is currently on the voice call. At box 604, the mobile device 102 communicates via the circuit switched domain 104 on a second call that is inactive. For example, the mobile device 102 receives a second call and it is on call waiting or the mobile device 102 user puts the second call on hold.

At box 606, the mobile device 102 identifies accessibility to the packet switched domain 106. For example, while still engaged on the first active and second inactive calls, the user comes within proximity of a wireless access point providing accessibility to a packet network. Transferring from the circuit switched domain 104 to the packet switched domain 106 at this point may be beneficial, such as by providing lower cost calls.

At box 692, the VCC status checker 120 determines the VCC status related to the mobile device 102. At box 696, the VCC status checker 120 determines whether the subscriber of the mobile device 102 is a VCC subscriber. For example, the VCC status checker 120 reads the parameter in the response message sent by the telecommunication network 108 during call setup or registration to determine the VCC status. Alternatively, the VCC status checker 120 determines the VCC status for the mobile device 102 by checking a storage device for the subscriber's subscription information.

At box 698, the VCC status checker 120 determines whether the mobile device 102 call has been anchored to the VCC server 206. For example, the VCC status checker 120 reads a parameter in the response message sent by the telecommunication network 108 or otherwise determines whether the call is anchored to a VCC server to determine the VCC status for the mobile device 102. Either or both determinations at blocks 696 and 698 may be made in various embodiments. Although FIG. 5 depicts boxes 692, 696, and 698 between boxes 606 and 608, the boxes 692, 696, 698 may be executed in other places in other embodiments, such as before or after boxes 602 and 604.

At box 608, the VCC status checker 120 determines if the mobile device 102 will attempt a domain transfer based on the VCC status that was determined. If the VCC status checker 120 determines that the mobile device 102 will attempt a domain transfer, the method proceeds to box 610.

At box 610, the mobile device 102 drops the second inactive call and attempts a domain transfer to the packet switched domain 106 on first active call. For example, because domain transfers to the packet switched domain 106 take priority over maintaining inactive calls, the mobile device 102 drops the inactive call and attempts a domain transfer from the circuit switched domain 104 to the packet switched domain 106 for the active call. In other embodiments, both the active and inactive calls may be VCC domain transferred to the packet domain.

At box 608, if the VCC status checker 120 determines that the mobile device 102 will not attempt a domain transfer, the method proceeds to box 612. At box 612, the mobile device 102 maintains the second inactive call and does not attempt a domain transfer to packet switched domain 106. For example, because the VCC status indicates that domain transfers are currently not allowed for the user of the mobile device 102, the mobile device 102 does not attempt a domain transfer to the packet switched domain 106 for the active call. Furthermore, the mobile device 102 does not drop the inactive call. While only two calls have been described, the present disclosure contemplates situations involving any number of active and inactive calls.

Although the present disclosure describes domain transfers from the circuit switched domain 104 to the packet switched domain 106, the present disclosure, in other embodiments, may be also be applied for domain transfers from the packet switched domain 106 to the circuit switched domain 104. In either case, the capability of the mobile device 102, whether the subscriber is a VCC subscriber, and whether the call is VCC anchored are similarly applied. Furthermore, while the present disclosure is applied in instances involving one or more inactive calls, in other embodiments, the present disclosure may also be applied in instances when there are no inactive calls.

Figure 6:
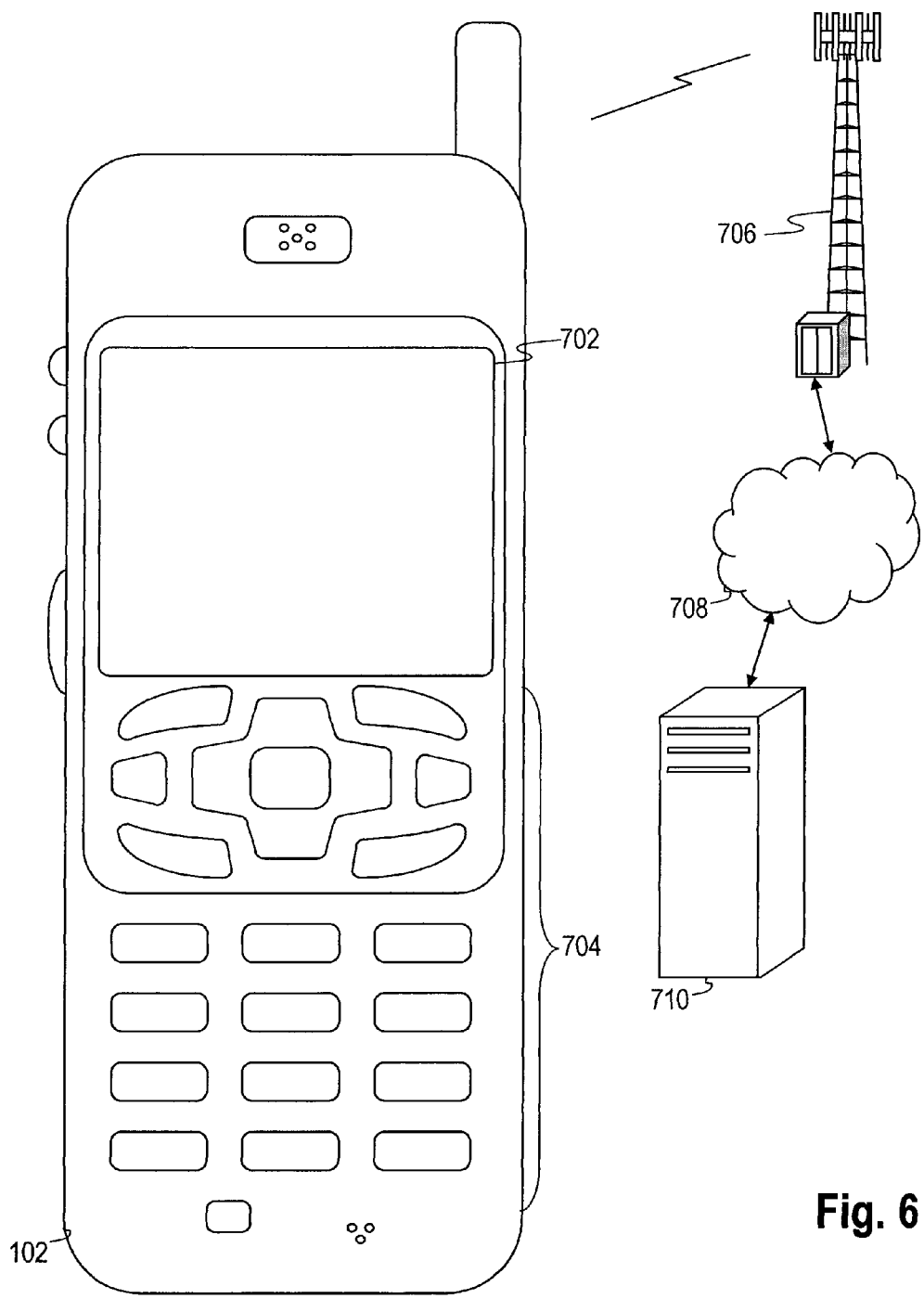
FIG. 6 is a diagram of a wireless communications system including a mobile device operable for some of the various embodiments of the disclosure.

FIG. 6 shows a wireless communications system including one embodiment of the mobile device 102. The mobile device 102 is operable for implementing aspects of the disclosure, but the disclosure should not be limited to these implementations. Though illustrated as a mobile phone, the mobile device 102 may take various forms including a wireless handset, a pager, a personal digital assistant (PDA), a portable computer, a tablet computer, or a laptop computer. Many suitable mobile devices combine some or all of these functions. In some embodiments of the disclosure, the mobile device 102 is not a general purpose computing device like a portable, laptop or tablet computer, but rather is a special-purpose communications device such as a mobile phone, wireless handset, pager, or PDA. In another embodiment, the mobile device may be a portable, laptop, or other computing device.

The mobile device 102 includes a display 702. The mobile device 102 also includes a touch-sensitive surface, a keyboard or other input keys generally referred as 704 for input by a user. The keyboard may be a full or reduced alphanumeric keyboard such as QWERTY, DVORAK, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. These applications may configure the mobile device 102 to perform various customized functions in response to user interaction.

Among the various applications executable by the mobile device 102 are a web browser, which enables the display 702 to show a web page. The web page is obtained via wireless communications with a cell tower 706, a wireless network access node, or any other wireless communication network or system. The cell tower 706 (or wireless network access node) is coupled to a wired network 708, such as the Internet. Via the wireless link and the wired network, the mobile device 102 has access to information on various servers, such as a server 710. The server 710 may provide content that may be shown on the display 702.

FIG. 7 shows a block diagram of the mobile device 102. The mobile device 102 includes a digital signal processor (DSP) 802 and a memory 804. As shown, the mobile device 102 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, a LCD controller 832, a charge-coupled device (CCD) camera 834, a camera controller 836, and a global positioning system (GPS) sensor 838.

The DSP 802 or some other form of controller or central processing unit operates to control the various components of the mobile device 102 in accordance with embedded software or firmware stored in memory 804. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the mobile device 102 to send and receive information from a cellular network or some other available wireless communications network. The RF transceiver 808 provides frequency shifting, converting received RF signals to baseband and converting baseband transmit signals to RF. The analog baseband processing unit 810 may provide channel equalization and signal demodulation to extract information from received signals, may modulate information to create transmit signals, and may provide analog filtering for audio signals. To that end, the analog baseband processing unit 810 may have ports for connecting to the built-in microphone 812 and the earpiece speaker 814 that enable the mobile device 102 to be used as a cell phone. The analog baseband processing unit 810 may further include a port for connecting to a headset or other hands-free microphone and speaker configuration.

The DSP 802 may send and receive digital communications with a wireless network via the analog baseband processing unit 810. In some embodiments, these digital communications may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the mobile device 102 and may also enable the mobile device 102 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the mobile device 102 to communicate wirelessly with other nearby mobile devices and/or wireless base stations.

The input/output interface 818 may further connect the DSP 802 to the alert 826 that, when triggered, causes the mobile device 102 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the mobile device 102. The keyboard 828 may be a full or reduced alphanumeric keyboard such as QWERTY, DVORAK, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the mobile device 102 to take digital pictures. The DSP 802 communicates with the CCD camera 834 via the camera controller 836. The GPS sensor 838 is coupled to the DSP 802 to decode global positioning system signals, thereby enabling the mobile device 102 to determine its position. Various other peripherals may also be included to provide additional functions, e.g., radio and television reception.

FIG. 8 illustrates a software environment 902 that may be implemented by the DSP 802. The DSP 802 executes operating system drivers 904 that provide a platform from which the rest of the software operates. The operating system drivers 904 provide drivers for the mobile device hardware with standardized interfaces that are accessible to application software. The operating system drivers 904 include application management services ("AMS") 906 that transfer control between applications running on the mobile device 102. Also shown in FIG. 8 are a web browser application 908, a media player application 910, and Java applets 912. The web browser application 908 configures the mobile device 102 to operate as a web browser, allowing a user to enter information into forms and select links to retrieve and view web pages. The media player application 910 configures the mobile device 102 to retrieve and play audio or audiovisual media. The Java applets 912 configure the mobile device 102 to provide games, utilities, and other functionality. A component 914 might be substantially similar to the VCC status checker 120 of FIG. 1, which is capable of reading the data 126 and otherwise determining if the subscriber for the mobile device 102 is a VCC subscriber, checking whether calls are anchored to the VCC server 206, and checking the data 126 to determine if any VCC activity has been successfully performed for the subscriber. The component 914 might be a firmware component, a hardware component, or a combination of software, firmware, and/or hardware.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile device, comprising:
a voice call continuity (VCC) status checker configured to, when the mobile device is communicating on a first call and a second call, determine a VCC status based upon VCC information stored in a memory of the mobile device, the VCC information indicative of whether to drop inactive calls during VCC related activities, wherein the VCC status checker is further configured to determine whether to initiate the VCC related activities based upon the VCC status, wherein the VCC related activities include disconnecting the second call if the first call is active and the second call is inactive, wherein if the VCC status prevents dropping the second call, the VCC status checker is configured to prevent the mobile device from initiating the VCC related activities, and wherein:
the first call is connected via a circuit switched domain;
the second call is connected via the circuit switched domain; and
the VCC related activities further include attempting a domain transfer to a packet switched domain on the first call.

2. The mobile device of claim 1, wherein the second call is one of a call on hold and a call waiting call, and wherein the first and second calls are voice calls.

3. The mobile device of claim 1, wherein the mobile device is VCC enabled, and, when a subscriber using the mobile device is a non-VCC subscriber, the VCC_status checker is further configured to prevent the mobile device from initiating the VCC_related activities.

4. The mobile device of claim 3, wherein the VCC status checker is further configured to check a storage device on the mobile device to determine whether the subscriber of the mobile device is a VCC subscriber.

5. The mobile device of claim 4, wherein the VCC status checker is further configured to select the storage device from a group consisting of a mobile device memory, and a removable memory module including one of a subscriber identity module, a universal subscriber identity module, a removable user identity module, a secure digital card, and a compact flash.

6. The mobile device of claim 3, wherein the VCC status checker is further configured to determine whether the subscriber of the mobile device is a VCC subscriber based upon a parameter of a message from a telecommunication network provider system.

7. The mobile device of claim 6, wherein the VCC status checker is further configured to determine the VCC status during a registration process.

8. The mobile device of claim 6, wherein the VCC status checker is further configured to determine during a call setup process.

9. The mobile device of claim 1, wherein VCC status checker is further configured to determine the VCC status based upon whether a mobile device call has been anchored to a VCC server.

10. The mobile device of claim 1, wherein the mobile device further comprises:
a communication module having a first mode to communicate via the circuit switched domain and having a second mode to communicate via the packet switched domain; and
a voice call continuity module configured to make the mobile device voice call continuity capable.

11. The mobile device of claim 1 wherein the VCC status comprises a subscriber associated with the mobile device being one of a VCC subscriber and a non-VCC subscriber, and wherein the VCC status identifies whether the subscriber is the VCC subscriber or the non-VCC subscriber.

12. The mobile device of claim 1, further comprising:
a memory storing the VCC information.

13. A method in a mobile device, comprising: when the mobile device is communicating on a first call and a second call:
determining a voice call continuity (VCC) status based upon VCC information stored in memory of the mobile device, the VCC information indicative of whether to drop inactive calls during VCC related activities;
determining whether to initiate the VCC related activities based upon the VCC status, wherein the VCC related activities comprise disconnecting the second call if the first call is active and the second call is inactive;
initiating the VCC related activities, if so determined; and
if the VCC status prevents dropping the second call, refraining from initiating the VCC related activities and maintaining the second call, wherein:
the first call is connected via a circuit switched domain;
the second call is connected via the circuit switched domain; and
the VCC related activities include attempting a domain transfer to a packet switched domain on the first call.

14. The method of claim 13, wherein determining the VCC status is further defined as at least one of determining whether a subscriber using the mobile device is a VCC subscriber and determining whether a mobile device call has been anchored to a VCC server.

15. The method of claim 13, further comprising:
refraining from attempting the domain transfer to the packet switched domain if the mobile device call has not been anchored to a VCC server.

16. The method of claim 14, wherein determining the VCC status is further defined as determining during call setup whether the subscriber of the mobile device is the VCC subscriber and whether the call made by the mobile device has been anchored at the VCC server.

17. The method of claim 14, wherein determining the VCC status is further defined as determining during registration whether the subscriber of the mobile device is the VCC subscriber.

18. The method of claim 14, wherein determining the VCC status is further defined as determining whether the subscriber of the mobile device is the VCC subscriber by checking a parameter in a message from a telecommunication network indicating whether the subscriber is the VCC subscriber.

19. The method of claim 14, wherein determining the VCC status is further defined as determining whether the call made by the mobile device is anchored at the VCC server by checking a parameter in a message from a telecommunication network indicating whether the call has been anchored at the VCC server.

20. The method of claim 14, wherein determining the VCC status is further defined as determining whether the subscriber of the mobile device is the VCC subscriber by checking a memory on the mobile device for data indicating that the subscriber is the VCC subscriber.

21. A non-transitory computer readable storage medium storing machine instructions which when executed on a mobile device, perform a method comprising:
when the mobile device is communicating on a first call and a second call:
determining a voice call continuity (VCC) status based upon VCC information stored in memory of the mobile device, the VCC information indicative of whether to drop inactive calls during VCC related activities;
determining whether to initiate the VCC related activities based upon the VCC status, wherein the VCC related activities comprise disconnecting the second call if the first call is active and the second call is inactive;
initiating the VCC related activities, if so determined; and
if the VCC status prevents dropping the second call, refraining from initiating the VCC related activities and maintaining the second call, wherein:
the first call is connected via a circuit switched domain;
the second call is connected via the circuit switched domain; and
the VCC related activities include attempting a domain transfer to a packet switched domain on the first call.

22. The non-transitory computer readable storage medium of claim 21, wherein, in the method, determining the VCC status is further defined as at least one of determining whether a subscriber using the mobile device is a VCC subscriber and determining whether a mobile device call has been anchored to a VCC server.

23. The non-transitory computer readable storage medium of claim 22, wherein, in the method, using the VCC status for the VCC related activities includes determining whether to drop calls and whether to initiate domain transfers based on the VCC status.

24. The non-transitory computer readable storage medium of claim 22, wherein when the mobile device is communicating on the first call via the circuit switched domain and is communicating on the second call via the circuit switched domain, and further when the packet switched domain had been identified, the machine instructions when executed further perform the method including:
when the subscriber is the VCC subscriber and the call is anchored to the VCC server, dropping the second call and thereafter attempting a domain transfer to the packet switched domain on the first call; and
when the call has not been anchored, maintaining the second call in the circuit switched domain and not attempting the domain transfer to the packet switched domain on the first call.

* * * * *

UNITED STATES PATENT AND TRADEMARK OFFICE
CERTIFICATE OF CORRECTION

PATENT NO.        : 8,073,447 B2                                              Page 1 of 1
APPLICATION NO.   : 11/671237
DATED             : December 6, 2011
INVENTOR(S)       : Adrian Buckley et al.

It is certified that error appears in the above-identified patent and that said Letters Patent is hereby corrected as shown below:

Claim 3, Col. 11, Line 65, replace "VCC_status" with -- VCC status --

Claim 3, Col. 11, Line 67, replace "VCC_related activities." with -- VCC related activities. --

Signed and Sealed this
Fifteenth Day of May, 2012

David J. Kappos
*Director of the United States Patent and Trademark Office*